3,560,483
1,4-DIALKYL-3,6-DIPHENYLEPI(THIO, DITHIA OR
    TETRATHIA)-2,5-PIPERAZINEDIONES
Steve George Svokos, Westwood, N.J., and Robert Bruce
  Angier, Pearl River, N.Y., assignors to American
  Cyanamid Company, Stamford, Conn., a corporation
  of Maine
No Drawing. Filed June 13, 1969, Ser. No. 833,147
            Int. Cl. C07d 93/36
U.S. Cl. 260—239.3                        9 Claims

ABSTRACT OF THE DISCLOSURE

This disclosure describes compounds of the class of 1,4-dialkyl-3,6-diphenylepi(thia, dithia or tetrathia)-2,5-piperazinediones useful as antifungal and antiviral agents.

BRIEF SUMMARY OF THE INVENTION

This invention relates to new organic compounds and, more particularly, is concerned with novel 1,4-dialkyl-3,6-diphenylepi(thia, dithia or tetrathia)-2,5-piperazinediones and with methods of preparing these compounds. The novel compounds of the present invention may be represented by the following general formulae:

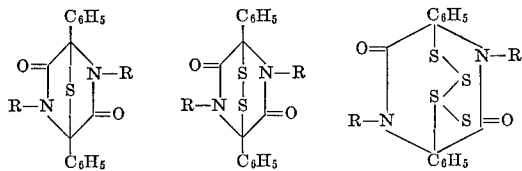

wherein R is lower alkyl. Suitable lower alkyl groups contemplated by the present invention are those having up to four carbon atoms such as, for example, methyl, ethyl, n-propyl, isopropyl, n-butyl, etc. Typical compounds of the present invention represented by the above general formulae are, for example, 1,4-diethyl-3,6-diphenylepitetrathia-2,5-piperazinedione, 1,4-di-n-propyl-3,6-diphenylepidithia-2,5-piperazinedione, 1,4 - diisopropyl - 3,6 - diphenylepithia-2,5-piperazinedione, 1,4-di-n-butyl - 3,6 - diphenylepitetrathia - 2,5 - piperazinedione, 1,4-diisobutyl-3,6 - diphenylepidithia - 2,5 - piperazinedione, 1,4-di(sec-butyl)-3,6-diphenylepithia-2,5-piperazinedione and 1,4-di-(tert - butyl)-3,6-diphenylepitetrathia-2,5-piperazinedione.

DETAILED DESCRIPTION OF THE INVENTION

The novel compounds of the present invention are generally obtainable as white or yellow crystalline materials having characteristic melting points and absorption spectra and appreciable solubility in organic solvents such as dimethylformamide, ethanol, isopropanol, and chloroform. However, they are generally insoluble in water and petroleum ether.

The novel compounds of the present invention may be readily prepared from 3,6-diphenyl-2,5-piperazinedione (I) as illustrated in the following reaction scheme:

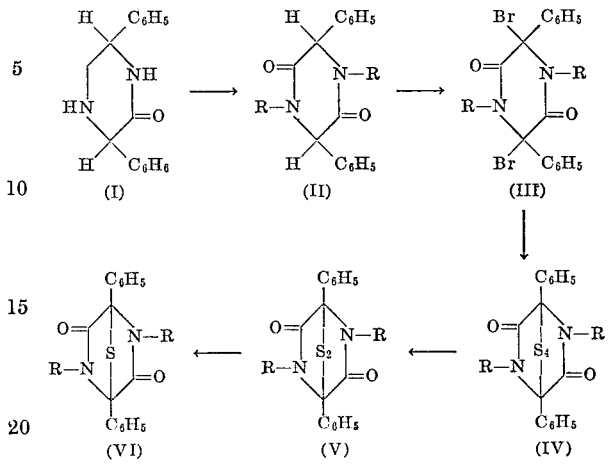

wherein R is as hereinabove defined. In accordance with the above reaction scheme, 3,6-diphenyl-2,5-piperazinedione (I) is alkylated at the 1 and 4 positions using a dialkyl sulfate such as diethyl sulfate, diisopropyl sulfate, di(tert-butyl) sulfate, etc. This alkylation is carried out in a suitable solvent such as ethanol and in the presence of a stoichiometric excess of a base (such as an alkali metal hydroxide) at room temperature for a period of time of 2–4 hours. The product, 1,4-dialkyl-3,6-diphenyl-2,5-piperazinedione (II), can be purified by repeated recrystallizations from glacial acetic acid. The 1,4-dialkyl-3,6-diphenyl-2,5-piperazinedione (II) is brominated at the 3 and 6 positions using bromine and a suitable solvent such as chlorobenzene or o-dichlorobenzene. Heating the reaction mixture to about 90°–160° C. facilitates the bromination and the use of lower temperatures necessitates longer reaction times. The brominated product (III) can be isolated by diluting the reaction solution with petroleum ether. Treatment of the 1,4-dialkyl-3,6-dibromo-3,6-diphenyl-2,5-piperazinedione (III) with an excess of anhydrous sodium tetrasulfide affords the corresponding 3,6-epitetrathia product (IV). In this reaction, an intimate mixture of anhydrous sodium tetrasulfide and the 1,4-dialkyl-3,6-dibromo - 3,6-diphenyl-2,5-piperazinedione (III) is dissolved in anhydrous lower alkanol or dimethylformamide at room temperature (0°–50° C.) whereupon the 1,4-dialkyl - 3,6 - diphenylepitetrathia-2,5-piperazinedione (IV) precipitates. A 1,4-dialkyl-3,6-diphenylepitetrathia-2,5-piperazinedione (IV) may be converted to the corresponding 1,4-dialkyl - 3,6 - diphenylepidithia-2,5-piperazinedione (V) upon treatment with an amount of tris-dimethylamino phosphine slightly in excess of two stoichiometric equivalents. This reaction is carried out in benzene or toluene as solvent at the reflux temperature for a period of 1–4 hours. The product (V) is isolated by evaporating the reaction mixture to dryness and recrystallizing the residue from a lower alkanol. A 1,4-dialkyl-3,6-diphenylepidithia-2,5-piperazinedione (V) may be converted to the corresponding 3,6-epimonothia derivative (VI) upon treatment with an amount of tris-dimethylamino phosphine slightly in excess of one stoichiometric equivalent. In like manner, this reaction is carried out in toluene as solvent at the reflux temperature for a period of 1-4 hours. Again, the product (VI) is isolated by evaporating the reaction mixture to dryness and recrystallizing the residue from a lower alkanol.

The novel compounds of the present invention are biologically active and have been found to possess broad-spectrum antifungal activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of fungal growth is noted. Appropriate calibration of these observations permits the quantitative calculation of the minimal inhibitory concentration (expressed in micrograms per milliliter) causing complete inhibition of growth for each test compound. By way of illustration, the minimal inhibitory concentrations of typical compounds of the present invention against various test organisms is set forth in Table I below.

TABLE I (1) 1,4-dimethyl-3,6-diphenylepitetrathia-2,5-piperazinedione
(2) 1,4-dimethyl-3,6-diphenylepidithia-2,5-piperazinedione
(3) 1,4-dimethyl-3,6-diphenylepithia-2,5-piperazinedione
(4) 1,4-diphenyl-3,6-epitetrathia-2,5-piperazinedione

| Fungal culture | Minimal inhibitory conc., mcg./ml. | | | |
|---|---|---|---|---|
| | (1) | (2) | (3) | (4) |
| *Microsporum canis* ATCC 10214 | 5 | 10 | 10 | 2.5 |
| *Microsporum gypseum* ATCC 14683 | 2.5 | 10 | 50 | 2.5 |
| *Trichophyton tonsurans* NIH 662 (E10) | 2.5 | 5 | 50 | 2.5 |
| *Trichophyton mentagrophytes* (E11) | 2.5 | 10 | 50 | 2.5 |
| *Trichophyton rubrum* (E97) | 2.5 | 5 | 100 | 2.5 |

The novel compounds of the present invention possess in vivo antifungal activity when tested against a *Cryptococcus neoformans* infection in mice. In this test a lethal systemic *Cryptococcus neoformans* infection is produced by an intravenous injection of the virus (0.2 ml. of a 1:20 trypticase soy broth dilution from a 24-hour culture shown in trypticase soy broth on a rotary shaker at 30° C.) into Carworth Farms CF1-S white female mice. The compound to be tested is supended and diluted in 0.2% aqueous agar and injected subcutaneously in a 0.5 ml. single dose within an hour after infection. Groups of infected, untreated mice are used as controls to show the lethality of the infection. In a representative operation, and merely by way of illustration, the pooled results (expressed as percent survivors on the 7th day after infection) of several tests run according to the above-described procedure with typical compounds of the present invention are set forth in Table II below:

TABLE II (1) 1,4-dimethyl-3,6-diphenylepitetrathia-2,5-piperazinedione
(2) 1,4-dimethyl-3,6-diphenylepidithia-2,5-piperazinedione
(3) 1,4-diphenyl-3,6-epitetrathia-2,5-piperazinedione

| Compound | Subcutaneous dose, mg./kg. | Alive/total mice (7 days post infection) | Percent survival |
|---|---|---|---|
| (1) | 400 | 6/10 | 60 |
| | 200 | 14/20 | 70 |
| | 100 | 12/15 | 80 |
| | 50 | 6/15 | 40 |
| | (¹) | 14/90 | 16 |
| (2) | 200 | 4/10 | 40 |
| | 100 | 6/10 | 60 |
| | 50 | 3/10 | 30 |
| | 25 | 4/10 | 40 |
| | (¹) | 0/40 | 0 |
| (3) | 100 | 4/10 | 40 |
| | 50 | 4/10 | 40 |
| | 25 | 5/10 | 50 |
| | (¹) | 0/40 | 0 |

¹ Infected, nontreated controls.

The antiviral utility of the novel compounds of the present invention is demonstrated by their ability to control lethal viral infections in mice since they show significant antiviral activity in mice against Coxsackie A21 (Coe) virus. In this test procedure the compound was administered in 3 subcutaneous doses to groups of Carworth Farms male, white mice, weight about 12 grams each and infected by an intraperitoneal injection of a Coxsackie A21 (Coe) virus preparation. The 3 doses of compound, suspended in water, were administered immediately after and at 2 and 4 hours after injection of the virus. Groups of infected, untreated mice were used as controls to show the lethality of the infection. In a representative operation, the pooled results (expressed as percent survivors on the 14th day after infection) of several tests run according to the above-described procedure with typical compounds of the present invention are set forth in Table III below:

TABLE III (1) 1,4-dimethyl-3,6-diphenylepitetrathia-2,5-piperazinedione
(2) 1,4-dimethyl-3,6-diphenylepidithia-2,5-piperazinedione

| Compound | Subcutaneous dose, mg./kg. | Alive/total mice (14 days post infection) | Percent survival |
|---|---|---|---|
| (1) | 30 | 8/15 | 53 |
| (2) | 1 | 5/15 | 33 |
| | (¹) | 2/60 | 3 |

¹ Infected, nontreated controls.

The invention will be described in greater detail in conjunction with the following specific examples.

EXAMPLE 1

Preparation of methyl D-phenylglycinate hydrochloride

To a solution, prepared by adding 55 ml. (0.84 mol) of thionyl chloride to 750 ml. of anhydrous methanol at zero degrees, was added 56.1 g. (0.37 mol) of D-α-phenylglycine. The solution was kept at room temperature for four days and the solvent was removed in vacuo to give 72 g. (99%) of white crystals with M.P. 200°–202° C. A 5.0 g. sample was recrystallized from methanol:ether to give 1.5 g. of white crystals with M.P. 204°–205° C. A second crop of white crystals with M.P. 206° C. and weighing 3.2 g. was obtained on further addition of ether to the mother liquor.

EXAMPLE 2

Preparation of D,D-3,6-diphenyl-2,5-piperazinedione

Conversion of the amino acid ester hydrochloride of Example 1 to the free base was accomplished by solubilizing 130.7 g. (0.65 mol) in 850 ml. of methanol and adding 90 ml. (0.65 mol) of triethylamine. The solution was stripped to dryness in vacuo on a steam bath to give a semi-solid. Extraction of the solid with ether left 93 g. of triethylamine hydrochloride (103%) with M.P. 245°–250° C. Concentration of the ether extract gave the ester (pale yellow oil), weight 95.0 g. (89%). The amino acid ester (free base) was heated at 180°–200° C. for 18 hours to give a reddish-pink solid which on trituration with ethanol gave 61.2 g. (86%) of pink crystals with M.P. 295°–299° C. For analysis a 1.0 g. sample, from a similar preparation, was recrystallized from 20 ml. of hot glacial acetic acid to give 0.65 g. of white crystals with M.P. 304°–306° C.

EXAMPLE 3

Preparation of D,D-1,4-dimethyl-3,6-diphenyl-2,5-piperazinedione

D,D - 3,6-diphenyl-2,5-piperazinedione (30.0 g., 0.112 mol) was partially dissolved in a solution composed of 400 ml. of 10% sodium hydroxide and 400 ml. of ethanol by warming. To the suspension was added three 24-ml. portions of dimethyl sulfate, at fifteen minute intervals. (After the third addition, complete solution occurred followed by formation of a precipitate.) Fifteen minutes after the last addition 120 ml. of dimethyl sulfate was added and the suspension was stirred at room temperature for three hours. The reaction mixture was diluted with 1500 ml. of water and chilled. The product (greenish-yellow crystals) was collected, washed well with water, ethanol and ether to give 17.5 g. (53%) of product with M.P. 276°–280° C. A 0.75 g. sample, from a similar preparation, when recrystallized from glacial acetic acid had M.P. 278°–280° C.

EXAMPLE 4

Preparation of 3,6-dibromo-1,4-dimethyl-3,6-diphenyl-2,5-piperazinedione

The dropwise addition of 0.2 ml. (4 mmoles) of bromine in 4.0 ml. of o-dichlorobenzene to a solution of 589 mg. (2 mmoles) of D,D - 1,4-dimethyl-3,6-diphenyl-2,5-piperazinedione in 10 ml. of o-dichlorobenzene at 150° C. gave, on cooling and dilution with 200 ml. of petroleum ether, 770 mg. (85%) of yellow crystals with M.P. 195°–197° C. This same product was obtained, in the same yield, when racemic 1,4-dimethyl-3,6-diphenyl-2,5-piperazinedione was used.

EXAMPLE 5

Preparation of 1,4-dimethyl-3,6-diphenylepitetrathia-2,5-piperazinedione (A) To a suspension of 904 mg. (2.0 mmoles) of 3,6-dibromo - 1,4-dimethyl-3,6 - diphenyl-2,5 - piperazinedione in 20 ml. of ethanol, at zero degrees, was added dropwise 4.0 mmoles of anhydrous sodium tetrasulfide in 20 ml. of ethanol. The white crystalline precipitate which formed was collected and washed well with water, ethanol and petroleum ether to give 130 mg. of product with M.P. 218°–222° C. A second crop of 75 mg. with M.P. 218°–222° C. was collected from the mother liquor and a third of 20 mg. with M.P. 226°–228° C. by adding ether to the mother liquor. The yield of product was 27%. Recrystallization of 130 mg. by solution in 5 ml. of hot chloroform and addition of 50 ml. of petroleum ether gave 85 mg. of white crystals with M.P. 226°–228° C.

(B) When anhydrous dimethylformamide was added to an intimate mixture of 452.2 mg. (1.0 mmole) of 3,6-dibromo - 1,4 - dimethyl -3,6 - diphenyl - 2,5 - piperazinedione and 261 mg. (1.5 mmole) of anhydrous sodium tetrasulfide pink crystals precipitated from the deep blue solution. After stirring for thirty minutes, the product was collected, washed well with water, ethanol and petroleum ether to give 290 mg. (69%) of product with M.P. 228°–230° C. On recrystallization there was obtained 250 mg. (59%) of product with M.P. 225°–226° C.

EXAMPLE 6

Preparation of 1,4-dimethyl-3,6-diphenylepidithia-2,5-piperazinedione

A deep blue solution, producted on addition of 126 g. (3.0 mmoles) of 1,4-dimethyl-3,6-diphenylepitetrathia-2,5-piperazinedione and 1.12 g. (6.86 mmoles) of tris-dimethylamino phosphine to 30 ml. of benzene, was refluxed for two hours. On cooling, the deep blue solution became straw yellow. The reaction mixture was taken to dryness in vacuo on a steam bath. Trituration of the semi-solid residue with petroleum ether yielded white crystals with M.P. 170°–174° C., weight 0.68 g. (64%). On recrystallization from 30 ml. of hot isopropanol there was obtained 0.41 g. (37%) of product with M.P. 178°–179° C.

EXAMPLE 7

Preparation of 1,4-dimethyl-3,6-diphenylepithia-2,5-piperazinedione

Refluxing a solution of 119 mg. (0.33 mmole) of 1,4-dimethyl-3,6-diphenylepidithia - 2,5 - piperazinedione and 65.3 mg. (.40 mmole) of tris-dimethylamino phosphine in 3 ml. of dry toluene for three hours gave, on cooling and removal of solvent in vacuo, a light yellow viscous oil. The oil was taken up in a small amount of glacial acetic acid and water added to turbidity. After standing 18 hours at room temperature the product, 81 mg. (79%) of white crystals with M.P. 77°–82° C., was collected. Recrystallization was accomplished by solubilizing the product in hot isopropanol and adding water to turbidity. The white crystals with M.P. 89°–90° C., weight 43.7 mg. (41%) were collected and dried in vacuo over phosphorous pentoxide.

EXAMPLE 8

Preparation of 3,6-dibromo-1,4-diphenyl-2,5-piperazinedione

A suspension of 2.66 g. (10 mmoles) of 1,4-diphenyl-2,5-piperazinedione, [P. J. Meyer, Mer. 10, 1967 (1877)] in 50 ml. of o-dichlorobenzene at 155° C., was treated with bromine (1.0 ml., 20 mmoles) in a dropwise fashion. On cooling the solution and diluting with an equal volume of petroleum ether there was obtained 3.1 g. (73%) of tan crystals with M.P. 180°–184° C. A 1.0 g. sample was recrystallized from hot toluene to give 0.49 g. of pale yellow crystals with M.P. 206°–210° C.

EXAMPLE 9

Preparation of 1,4-diphenyl-3,6-epitetrathia-2,5-piperazinedione

To 60 ml. of anhydrous ethanol at 0° C. was added 6.37 g. (15 mmoles) of 3,6-dibromo-1,4-diphenyl-2,5-piperazinedione. The suspension was then treated, in a dropwise manner, with 5.22 g. (30 mmoles) of anhydrous sodium tetrasulfide in 120 ml. of dry ethanol. The reaction mixture was stirred at zero degrees for 1.5 hours. Clarification of the reaction mixture yielded, after washing the collected product with water, ethanol, ether and petroleum ether, 4.8 g. (83%) of pale yellow crystals with M.P. 190°–195° C. Recrystallization was accomplished by dissolving 4.5 g. of product in 45 ml. of warm dimethylformamide (steam bath) and then adding water to turbidity. On chilling there was obtained 1.8 g. (31%) of crystalline product with M.P. 237°–238° C.

We claim:
1. A compound of the formula:

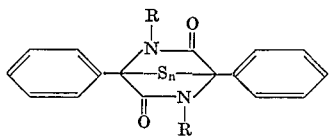

wherein R is lower alkyl and $n$ is an integer selected from the group consisting of 1, 2 and 4.

2. A compound according to claim 1 wherein $n$ is one and R is methyl.

3. A compound according to claim 1 wherein $n$ is two and R is methyl.

4. A compound according to claim 1 wherein $n$ is four and R is methyl.

5. A compound according to claim 1 wherein $n$ is one and R is ethyl.

6. A compound according to claim 1 wherein $n$ is four and R is n-propyl.

7. A compound according to claim 1 wherein $n$ is two and R is isopropyl.

8. A compound according to claim 1 wherein $n$ is four and R is isobutyl.

9. A compound according to claim 1 wherein $n$ is two and R is tert-butyl.

References Cited

Nagarajan et al.: "J. Am. Chem. Soc.," vol. 90, No. 11, May 22, 1968, pp. 2980–2982.

HENRY R. JILES, Primary Examiner

R. T. BOND, Assistant Examiner

U.S. Cl. X.R.

260—243, 268; 424—246

UNITED STATES PATENT OFFICE
CERTIFICATE OF CORRECTION

Patent No. 3,560,483          Dated February 2, 1971

Inventor(s) Steve George Svokos and Robert Bruce Angier

It is certified that error appears in the above-identified patent and that said Letters Patent are hereby corrected as shown below:

Column 2, Formula (I),

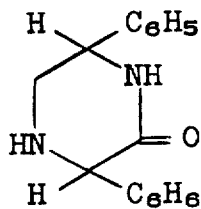 should read 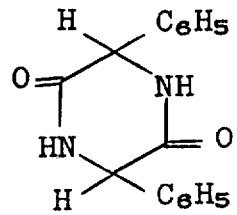

Column 3, line 66 "shown" should read -- grown --.

Signed and sealed this 20th day of July 1971.

(SEAL)
Attest:

EDWARD M. FLETCHER, JR.
Attesting Officer

WILLIAM E. SCHUYLER, JR.
Commissioner of Patents